US008798811B2

(12) United States Patent
Vial

(10) Patent No.: US 8,798,811 B2

(45) Date of Patent: Aug. 5, 2014

(54) METHOD AND DEVICE FOR ASSISTING IN THE DIAGNOSTIC AND IN THE DISPATCH DECISION OF AN AIRCRAFT

(75) Inventor: Jean-Sebastien Vial, Colomiers (FR)

(73) Assignee: Airbus Operations, Toulouse (FR)

( * ) Notice: Subject to any disclaimer, the term of this patent is extended or adjusted under 35 U.S.C. 154(b) by 605 days.

(21) Appl. No.: 12/539,305

(22) Filed: Aug. 11, 2009

(65) Prior Publication Data

US 2010/0049379 A1 Feb. 25, 2010

(30) Foreign Application Priority Data

Aug. 20, 2008 (FR) ..................................... 08 55651

(51) Int. Cl.

| | |
|---|---|
| ***G01C 23/00*** | (2006.01) |
| ***G05D 1/00*** | (2006.01) |
| ***G05D 3/00*** | (2006.01) |
| ***G06F 7/00*** | (2006.01) |
| ***G06F 17/00*** | (2006.01) |
| ***G01M 17/00*** | (2006.01) |
| ***G06F 11/30*** | (2006.01) |
| ***G06F 19/00*** | (2011.01) |
| ***G07C 5/00*** | (2006.01) |

(52) U.S. Cl.

USPC .............................................. 701/3; 701/29.1

(58) Field of Classification Search

USPC .................................................... 701/3, 29.1

See application file for complete search history.

(56) References Cited

U.S. PATENT DOCUMENTS

2003/0033178 A1* 2/2003 Black et al. ...................... 705/7
2003/0167111 A1* 9/2003 Kipersztok et al. ............ 701/29
2004/0111197 A1* 6/2004 Kipersztok et al. ............ 701/29
2004/0158367 A1* 8/2004 Basu et al. ...................... 701/29
2005/0075769 A1* 4/2005 Eschborn et al. .............. 701/29
2008/0010005 A1* 1/2008 Small et al. ................... 701/120
2008/0215194 A1* 9/2008 Bailly et al. ..................... 701/3

FOREIGN PATENT DOCUMENTS

EP 1 455 313 A1 9/2004

OTHER PUBLICATIONS

Philip A. Scandura, et al., "A Unified System to Provide Crew Alerting, Electronic Checklists and Maintenance Using IVHM" Digital Avionics Systems Conference, XP010764903, Oct. 24, 2004. 19 pages.

* cited by examiner

*Primary Examiner* — Imran Mustafa

(74) *Attorney, Agent, or Firm* — Oblon, Spivak, McClelland, Maier & Neustadt, L.L.P.

(57) ABSTRACT

The invention has as its object in particular a method and a device for aiding in the diagnosis and in the decision on operation of an aircraft comprising means for detection of failures relating to the pieces of equipment thereof. After having received (400) at least one alert linked to the detection of at least one failure relating to at least one piece of equipment of the said aircraft, the said at least one alert comprising at least one indication relating to the said at least one failure, and at least one information item relating to the next mission of the said aircraft, a database comprising a minimum equipment list and operating conditions and/or limitations associated with the operation thereof is accessed. A correlation (445) of the said at least one indication relating to the said at least one failure with the said minimum equipment list and the said at least one information item relating to the next mission of the said aircraft then is performed in order to determine (465) the operating state of the said aircraft.

9 Claims, 6 Drawing Sheets

METHOD AND DEVICE FOR ASSISTING IN THE DIAGNOSTIC AND IN THE DISPATCH DECISION OF AN AIRCRAFT

FIELD OF THE INVENTION

This invention relates to a method and a device for aiding in the diagnosis and in the decision on operation of an aircraft when at least one failure is detected.

DESCRIPTION OF RELATED ART

Generally speaking, for reasons of safety, the pilot must make sure of the functionality of the different pieces of equipment of the aircraft prior to carrying out a mission assigned to the latter.

To aid the pilot in making a diagnosis of the aircraft, sensors and monitoring devices are used. In this way the pilot is alerted when a failure is detected, which allows him to apply the corrective actions in flight. Furthermore, this failure detection is the main input for the maintenance teams when they must intervene on the aircraft between two missions. Generally, starting from a failure detected in the course of a preceding mission, two scenarios are possible from the maintenance point of view: the failure is corrected and therefore no longer exists for the following mission or maintenance cannot intervene, for example because of lack of time or resources, and the failure remains open for the following mission; it is said to be deferred.

In this way, a pilot can determine the technical state of the different pieces of equipment of the aircraft from the information received, from observation of the components of the aircraft and from reports prepared in particular by the maintenance teams, especially the deferred failures, and the crew members having carried out the most recent missions.

Moreover, the pilot has a document called MEL (acronym for Minimum Equipment List in English terminology) established by the airline company operating the aircraft starting from a document called MMEL (acronym for Master Minimum Equipment List in English terminology) the content of which makes it possible to identify the conditions under which the aircraft can be operated despite the existence of failure. In this way, when a failure is detected and deferred, the pilot must consult the MEL in order to decide whether the aircraft can carry out a mission that is assigned thereto.

The MEL groups together all the pieces of equipment that can be inoperative for making a flight. This list provides for the operation of an aircraft under specific conditions, with tolerances for particular malfunctioning pieces of equipment. This list is in accordance with the MMEL that relates to the type of aircraft concerned, it is more restrictive than the latter. Usually, the reference minimum equipment list is a list that is drawn up by the manufacturer of the aircraft for a particular type of aircraft, with the approval of the manufacturer's government, and it contains the components one or more of which are permitted to be malfunctioning at the start of a flight.

The MEL comprises particularly the list of potential technical failures. Each technical failure is associated, in particular, with an identifier, a failure description, a maximum acceptable duration for the failure state, a number of occurrences of the function, system or piece of equipment subjected to the potential failure, a minimum number of occurrences necessary for the flight under exemption and, as the case may be, additional restrictive conditions. These restrictive conditions can consist in the state of one or more given systems, functions or pieces of equipment, that is, its operating condition (operational or out of service), its functional position (open, closed, on, off, etc.) or the state of selection of its control (turned on, turned off, opening, closing, etc.). The restrictive conditions also can consist in the logical combinations of the states of several systems, functions or pieces of equipment. The logical conditions also can apply to limitations for operating use such as an altitude or a limited flying level or disadvantaged performances of the aircraft. Each technical failure also can be associated with specific procedures that the flight crew is to apply in the face of such a failure.

The conforming of the detected failures and the content of the MEL makes it possible to determine whether the aircraft is able to carry out a mission without restriction, whether it is unable to carry it out or whether it can carry it out under certain conditions. Such conditions can be linked to the mission, for example to the outside temperature or to the length of the landing or takeoff runway, to the aircraft, for example the state of a redundant system, or to particular procedures such as the manual verification of the proper functioning of a system prior to takeoff.

It should be noted here that the grounding time of aircraft represents a considerable cost for the airline companies. It is therefore advantageous to perform diagnosis operations in flight. The attention of the pilots, however, should not be diverted from their main job linked to piloting, nor should an extra workload be created.

In order to respond to these difficulties, automation systems for the MELs have been developed to make it possible, starting from the failures detected and the observations made, to indicate to the pilot the limitations for operation of the aircraft.

Nevertheless, while these systems are satisfying, there is a need to improve them in order to aid the pilot even more in determining whether the aircraft can be operated, to reduce the workload of the pilot and more generally to enhance the safety of the aircraft.

BRIEF SUMMARY OF THE INVENTION

The invention makes it possible to resolve at least one of the problems set forth above.

The invention thus has as an object a method for aiding in the diagnosis and in the decision on operation of an aircraft, the said aircraft comprising means for detection of failures relating to pieces of equipment of the said aircraft, this method comprising the following steps, receiving at least one alert linked to the detection of at least one failure relating to at least one piece of equipment of the said aircraft, the said at least one alert comprising at least one indication relating to the said at least one failure;

receiving at least one information item relating to the next mission of the said aircraft;

accessing a database comprising a minimum equipment list and operating conditions and/or limitations associated with the operation thereof;

correlating the said at least one indication relating to the said at least one failure with the said minimum equipment list and the said at least one information item relating to the next mission of the said aircraft; and, determining the operating state of the said aircraft in response to the said correlation step.

The method according to the invention thus makes it possible to determine the operating state of an aircraft according to the failures detected and the parameters of the next missions.

Advantageously, the method furthermore comprises a step of determining at least one limitation or restriction for operation associated with the operating state of the said aircraft in response to the said correlation step.

According to one particular embodiment, the method furthermore comprises a step of establishing a list of additional tasks and/or verifications to be performed in response to the said correlation step. In this way the method according to the invention is able to provide an aid to the crew member to remind him to perform certain additional tasks and/or verifications in accordance with the failures detected and the mission parameters.

Advantageously, the method furthermore comprises a step of associating a time indication with at least one component of the said list in order to allow the automatic display of the said component to the pilot of the said aircraft at the moment defined by the said time indication.

The said correlation step preferably comprises a step of determining the functional state of the said aircraft in order to improve the determination of its operating state.

According to one particular embodiment, the method furthermore comprises a step of filtering the said at least one alert and a step of displaying the said alert in response to the said filtration step. In this way, all the alerts preferably are used to determine the operating state of the aircraft but only the alerts relevant for the crew members are displayed so as not to disturb them.

The method furthermore preferably comprises a step of identifying the said at least one failure, the said identification step comprising a step of receiving at least one additional indication relating to the said at least one failure in order to improve the determination of the operating state of the aircraft.

The invention also has as an object a computer program comprising instructions adapted to the implementation of each of the steps of the method described above.

The invention likewise has as an object a device comprising means suited to the implementation of each of the steps of the method described above, as well as an aircraft comprising this device.

BRIEF DESCRIPTION OF THE SEVERAL VIEWS OF THE DRAWINGS

Other advantages, purposes and features of this invention emerge from the detailed description that follows, given by way of non-limitative example, with reference to the attached drawings in which.

DETAILED DESCRIPTION OF THE INVENTION

Figure 1:
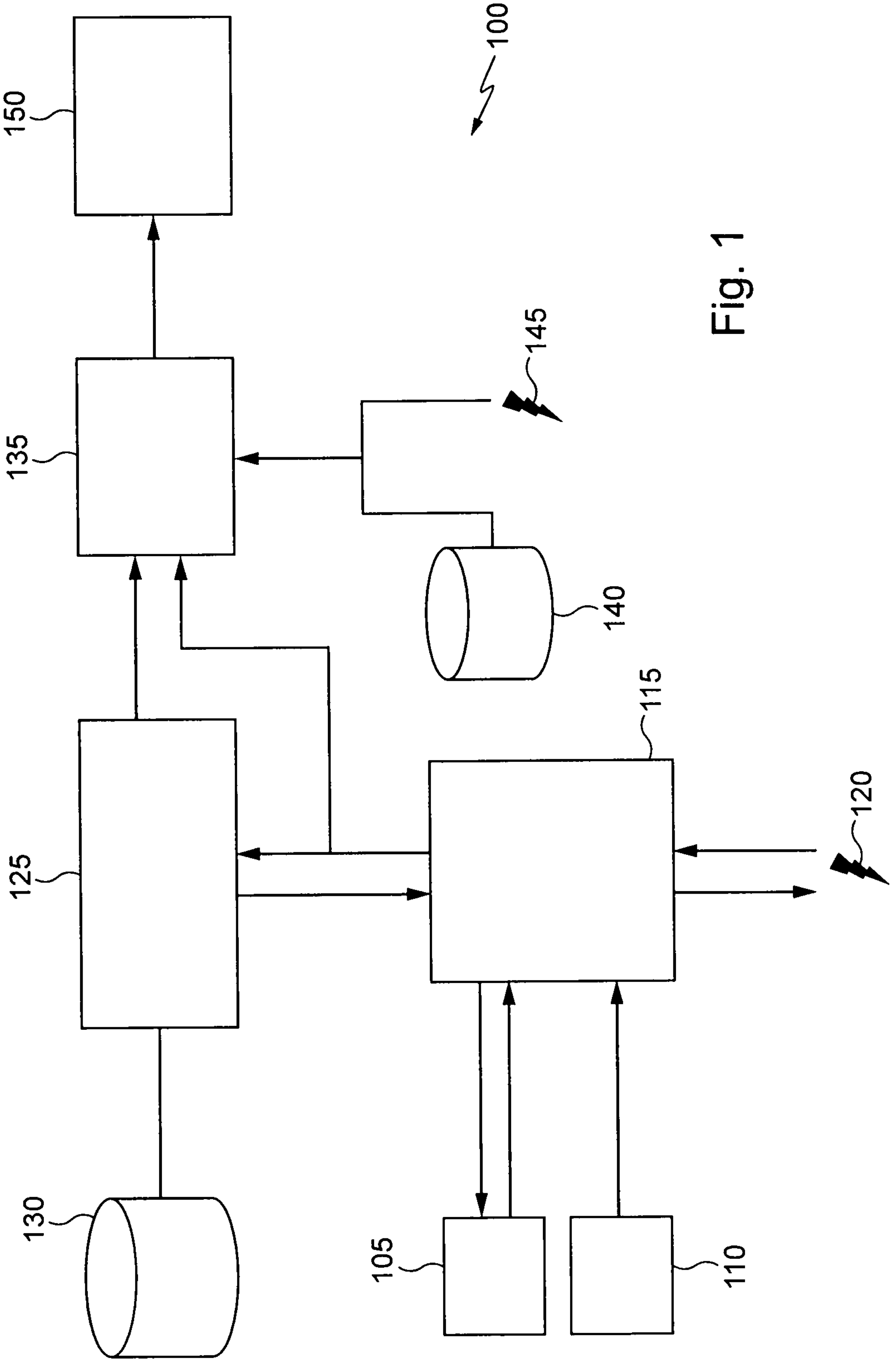
FIG. 1 schematically shows a first exemplary device for aiding in the decision on operation of an aircraft according to the invention.

FIG. 1 schematically shows a first exemplary device for aiding in the decision on operation of an aircraft. Device 100 is intended to aid the pilot in evaluating the functionality of the different pieces of equipment of the aircraft and in determining whether the latter is able to carry out the mission or missions that have been assigned thereto.

The device here comprises a set of components 105 used to detect failures of the systems with which they are associated. These components are, for example, pieces of equipment of the alarm monitor and computer type. They make it possible to detect and transmit alerts in order to indicate faults and failures to the pilot. Such components, which can comprise one or more sensors and processing units, can be associated with each system of the aircraft or centralized, in whole or in part.

According to one particular embodiment, certain processing units of components 105 can comprise prognosis functionalities in order to take into account a likely failure of a system of the aircraft.

The device also comprises capture means 110 allowing the pilot to input observations relating to the state of the aircraft such as a chip in the windshield or a broken control button. The capture means comprise, for example, an alphanumeric keyboard and a pointing device associated with a display screen, such as a mouse.

The set of components 105 used to detect failures, as well as the capture means 110, are connected to a computer 115 suited to determining a failure state of the aircraft. This failure state shows all the failures detected on the different systems of the aircraft. Each failure is referenced here in accordance with a predetermined format allowing its subsequent processing, in particular in relation to the MEL.

The computer also can receive information items such as diagnosis and/or prognosis information items via a communication with the ground, referenced 120, preferably a wireless communication such as a satellite communication. These information items can result from a processing of the data received from the aircraft by a maintenance control center.

The computer 115 is connected to the computer 125, itself connected to a database 130. The computer 125 makes it possible to establish a first correlation by comparing the failure state of the aircraft with the MEL in order, in particular, to determine the capability of the aircraft to be used in this state or whether a maintenance intervention is obligatory. In other words, the computer 125 makes it possible to determine the functional state of the aircraft.

The database 130 contains, for example, an electronic version of the MEL, the latter comprising the indications set forth above. Alternatively, the database 130 can comprise a minimum equipment list, more restrictive than the MEL, taking into account specific parameters such as commercial operation parameters.

The computers 115 and 125 are connected to the computer 135 which has as its main purpose to filter the alerts originating from the computer 115 and to establish a second correlation in order to provide an aid in the decision on operation of the aircraft. This second correlation is determined according to the failures detected, the MEL or similar indications and operating data relating to the missions assigned to the aircraft. These operating data can be stored in a database 140 or received via a communication 145, for example a satellite communication. This second correlation thus sets the possible operating conditions and/or limitations associated with the flight operation in a given failure state. In other words, the computer 135 makes it possible to determine the operating state of the aircraft according to the planned missions.

The detected alerts relating only to the capability of the aircraft to carry out a future mission and having no importance for the current flight preferably are filtered by the computer 135 so as not to disturb the pilot. Nonetheless, these alerts advantageously are stored to be processed later, for example in order to carry out maintenance operations. The filtering is accomplished, for example, according to the nature and level of the alerts.

All the alerts detected are processed here by the computer 135 in order to aid the pilot in deciding whether the aircraft is capable of carrying out the next mission or missions. For these purposes, the functional limitations determined by the computer 125 are compared with the data received relating to the next missions. If it results from this comparison that the next mission or missions can be carried out subject to certain reservations, for example, by modifying the standard procedures (also called standard operating procedures), a list of tasks to be performed is constructed in order to indicate the tasks to be performed at the given moment.

The alerts having an effect on the flight in progress as well as the results of the comparison of the functional limitations determined by the computer 125 with the data received relating to the next missions are presented to the pilot, for example in the form of display on a display screen 150.

Although the computers 115, 125 and 135 are shown separately here, the functions performed by the latter naturally can be implemented by a single computer or two computers functioning redundantly.

The state of the aircraft, which is known through the computer 125, in particular from the information items created by the set of components 105 and the capture means 110, and which allows the computer 125 to produce a correlation, can comprise in particular the following information items:

information items on breakdown of each function, system or piece of equipment. As indicated above, such a breakdown information item can be provided directly by the pilot, in particular with the aid of the capture means, transmitted by failure detection systems (diagnosis or prognosis);

the date and time of the failure;

the current date and time;

the number of flights carried out after identification of the failure;

the states of the systems, functions or pieces of equipment the knowledge of which is necessary (automatically determined or provided manually). These states can be operating, functional or determined by the control selection state.

Mission information items used by the computer 135 to aid the pilot in determining whether the aircraft can be operated according to the results of correlation of the failure state of the aircraft with the MEL advantageously comprise the conditions of the missions, in particular the conditions of load of the aircraft, the weather conditions and the route to be taken, as well as the parameters of the airline company operating the aircraft. Such parameters are, for example, passenger comfort parameters, consumption and wear-and-tear parameters as well as maintenance parameters. The comfort parameters apply to the functioning of systems not essential to the piloting and safety of the aircraft, such as air conditioning and entertainment systems, for example video, while the maintenance parameters apply, for example, to the availability of a maintenance team and spare parts at the stopovers and destinations of the aircraft.

For each failure identified in flight, the computer 135 determines whether it has an impact on the flight in progress. If the answer is yes, the alert is presented to the pilot. Moreover, each identified failure is compared with the MEL to determine whether the aircraft is capable of making another takeoff. If the failure indication received is not sufficient for determining the consequences thereof, the computer 125 queries the computer 115 which, in turn, can query the set of components 105, for example the BITES. If it is not possible to clear up an ambiguity over the consequences of a detected failure, for example, if it is not possible to isolate the failure, the computer 115 can query the pilot or an operator, for example a maintenance operator on the ground.

In this way, the computer 125 is able to determine whether the aircraft has the functional capabilities to carry out the next missions (state known under the name of "GO"), whether the aircraft does not have the functional capabilities to carry out the next missions (state known under the name of "NO GO") and whether the aircraft has the functional capabilities to carry out the next missions subject to certain reservations linked to the missions or to particular procedures (state known under the name of "GO IF").

In order to determine the functional state, the computer 125 moreover preferably is in charge of working out the date of exception in relation to the identification of a failure (or determining the number of flights made since the identification of the failure) as well as comparing the current date with that of identification of the failure (or comparing the number of flights made with the maximum number of flights authorized).

If the aircraft has the functional capabilities to carry out the next missions subject to certain reservations linked to the missions or to particular procedures, these conditions are transmitted to the computer 135 where they are compared with the mission data. As indicated above, these conditions can comprise functional restrictions, operating restrictions and/or particular tasks to be performed. Functional restrictions preferably are verified by the computer 125.

If need be, a list of particular tasks to be performed is determined. This list of tasks indicates the operations that are to be performed in addition to or in place of operations provided for in the standard procedures, called SOP (acronym for Standard Operating Procedure in English terminology). Advantageously, an indication is associated with each task on the list in order to define the moment at which the task is to be performed. This indication can apply, for example, to a flight phase such as the descent.

Thus, by way of illustration, if a failure is detected in the braking system, the MEL can indicate that it is possible to operate the aircraft despite this failure, for 10 days after identification of the failure, provided that an auxiliary braking circuit is checked prior to the landing. As this failure potentially has an effect on the flight in progress, it is indicated to the pilot. If it is accepted that the destination of the second mission is the maintenance center for the aircraft, it is indicated to the pilot that only the next mission and the following one can be carried out with checking the auxiliary braking circuit prior to the landing. In the course of the next two missions, the pilot is told, during the descent, to check the auxiliary braking circuit.

At any time, the pilot or the operator can query the computer 150 in order to know the operating state of the aircraft to carry out the next missions as well as the possible conditions and/or restrictions.

Figure 2:
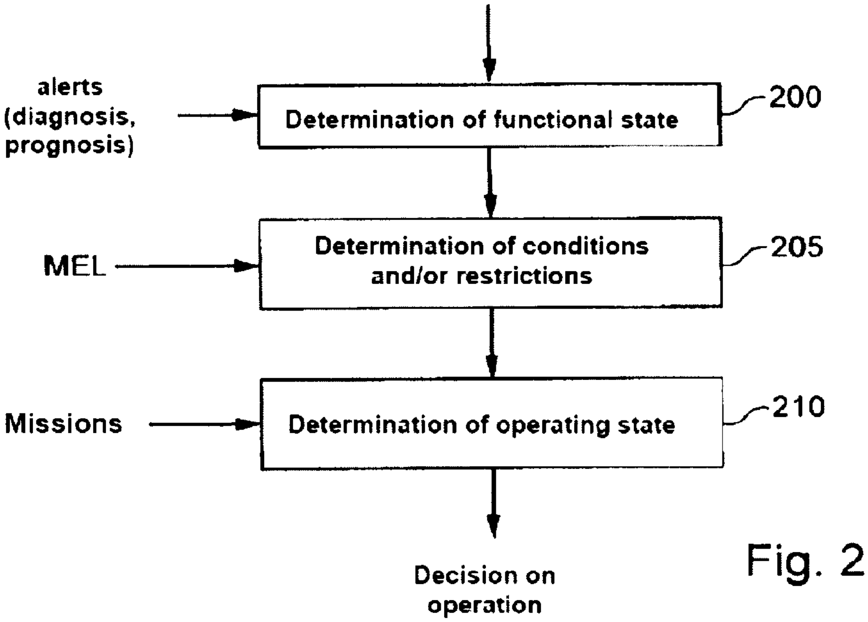
FIG. 2 schematically illustrates certain steps of the algorithm implemented in the device illustrated on FIG. 1 to aid a pilot in deciding whether an aircraft can be operated to carry out the planned mission or missions.

FIG. 2 schematically illustrates certain steps of the algorithm implemented in the device 100 to aid the pilot in deciding whether the aircraft can be operated to carry out the planned mission or missions.

A step 200 has as its purpose to determine the functional state of the aircraft. As indicated above, this state is determined from the MEL or from corresponding data and from alert, diagnosis and/or prognosis devices, these devices being integrated into the aircraft and/or into a ground system.

The possible conditions and restrictions for carrying out the next mission or missions then are determined by comparing the functional state of the aircraft with the MEL (step 205).

A following step has as its purpose to determine the operating state of the aircraft according to the conditions and restrictions linked to its functional state and the planned missions (step 210). This step takes into account flight parameters and operation parameters.

In this way, according to the result of these steps, the pilot is informed about the possibility of carrying out the next mission or missions. If it is possible to carry out these missions under certain conditions, the pilot can decide, according to the latter, whether the aircraft can be used to carry them out.

Figure 3:
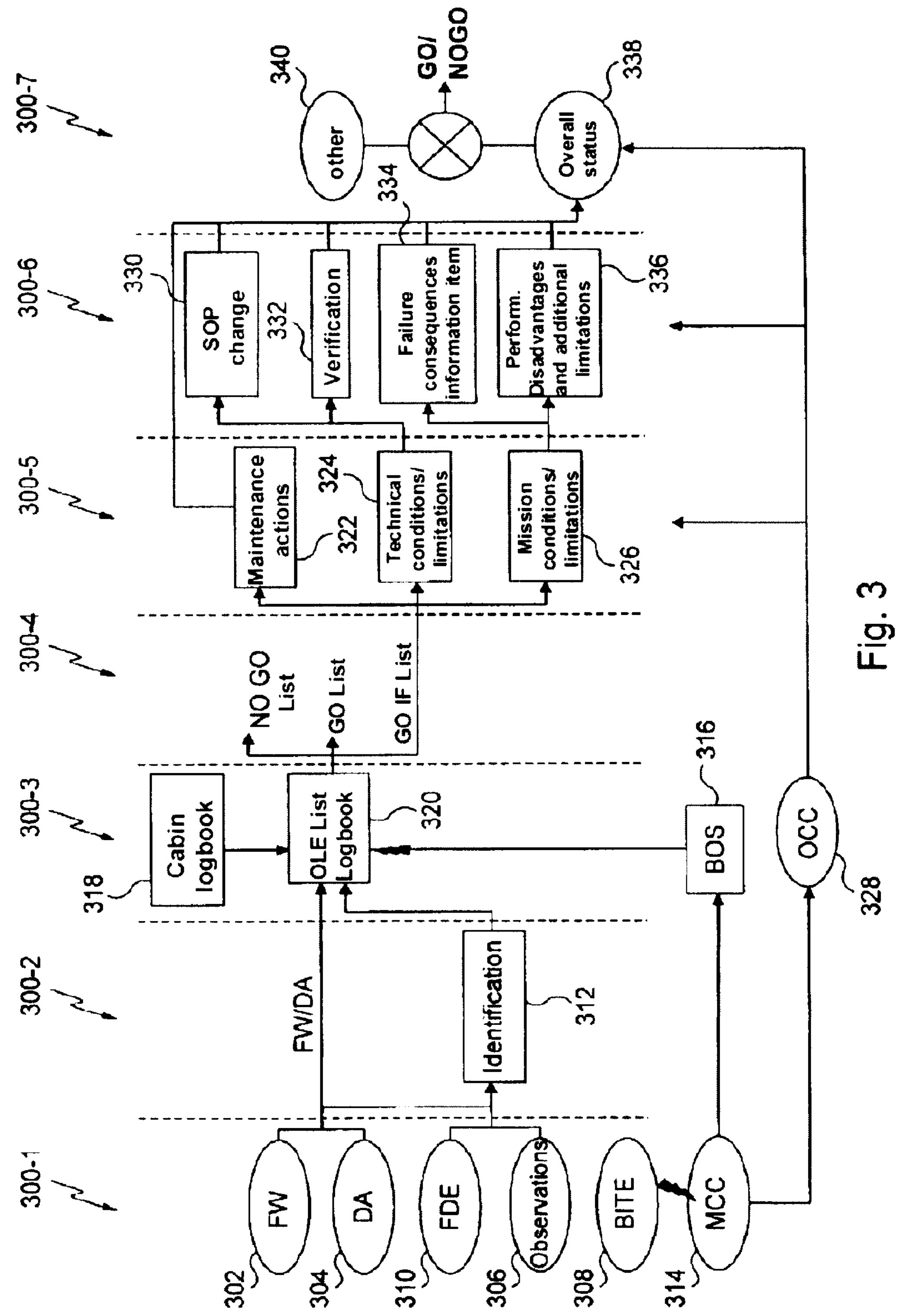
FIG. 3 schematically shows a second example of the implementation of the process for aiding in the decision on operation of an aircraft.

FIG. 3 schematically shows a second example of the implementation of the process for aiding in the decision on operation of an aircraft. The process here is divided into seven parts referenced 300-1 to 300-7. Part 300-1 corresponds to a phase of failure detection or identification, part 300-2 to a phase of identification, part 300-3 to a phase of declaration and determination of the functional status of the aircraft, part 300-4 to the functional status of the aircraft, part 300-5 to a phase of determination of the operating conditions and limitations, part 300-6 to a phase of determination of the tasks and procedural changes and part 300-7 to a phase of decision.

The phase of detection (part 300-1) makes use of devices adapted for detecting failures and generating alerts of type FW (abbreviation for Flight Warning in English terminology), referenced 302, and type DA (abbreviation for Dispatch Advisory in English terminology), referenced 304, which can be compared directly with the inputs from the MEL. These alerts are, for example, of the ECAM type adapted to the format of the MEL.

The phase of detection also makes use of other detection devices such as means for capture of observations by the pilot or by an operator, for example a maintenance operator, referenced 306, systems of BITE type, referenced 308, and other systems called FDE (abbreviation for Flight Deck Effects in English terminology), referenced 310. These devices are used, in particular, when an alert of type FW or DA does not make it possible to determine unambiguously the source of a failure in order to supply the identification data 312 for identifying the detected failures (part 300-2).

According to the embodiment illustrated, systems of BITE type are connected to a maintenance control center on the ground called MCC (abbreviation for Maintenance Control Center in English terminology), referenced 314, where the data originating from these systems are analyzed. The result of this analysis is transmitted to a support center 316, called BOS (acronym for Back Office Support in English terminology), to be retransmitted to the aircraft.

The data exchanges between the aircraft and the ground systems, in particular the MCC 314 and the BOS 316, are accomplished with the aid of wireless communication technologies such as satellite communication technologies.

The data relating to the detected failures as well as those allowing identification thereof are transmitted to a declaration device (part 300-3) from which there are generated a logbook and a list called OLE (acronym for Open Logbook Entry in English terminology). These information items are used, with that from the logbook on board 318, to determine the functional status of the aircraft (reference 320). As indicated above, the functional status of the aircraft can be "NO GO," "GO" or "GO IF" (part 300-4).

When the functional status of the aircraft is "GO IF," the maintenance actions (reference 322) to be implemented are determined, the technical conditions and limitations (reference 324) are evaluated, as well as the operating conditions and limitations (reference 326) linked to the planned missions (phase 305). The information items relating to the planned missions are received from the operating control center called OCC (abbreviation for Operating Control Center in English terminology). The operating control center also can transmit technical information items on operation of the aircraft according to the policy of the airline company, for example.

It should be pointed out here that information items 324 and 326 preferably are evaluated prior to each takeoff.

The technical conditions and limitations 324 are used in particular with data received from the operating control center to determine the changes that should be made in the standard procedures (reference 330) as well as to determine the configuration of the aircraft that should be adopted and components to be checked (reference 332). Likewise, the operating conditions and limitations 326 make it possible to indicate the operating consequences linked to the identified failures (reference 334) as well as the other constraints (reference 336), in particular performance constraints. These operations are carried out during the phase of determination of tasks and changes in procedure (part 300-6).

The changes that are to be made in the standard procedure preferably are put together in list form. As noted above, an indication of time advantageously is associated with each component on the list in order to indicate the change to the pilot in due time.

The maintenance actions to be performed, the changes made in the standard procedures, the new configuration, the components to be checked, the operating consequences linked to the identified failures as well as the other constraints make it possible to determine an overall status (referenced 338) that is presented to the pilot, if need be with other indications (reference 340) such as the opinion of a technical operation agent, called dispatcher in English terminology, and with the data received from the operating control center, in order to aid him in deciding whether or not the aircraft can be operated to complete the planned missions (part 300-7).

Figure 4:
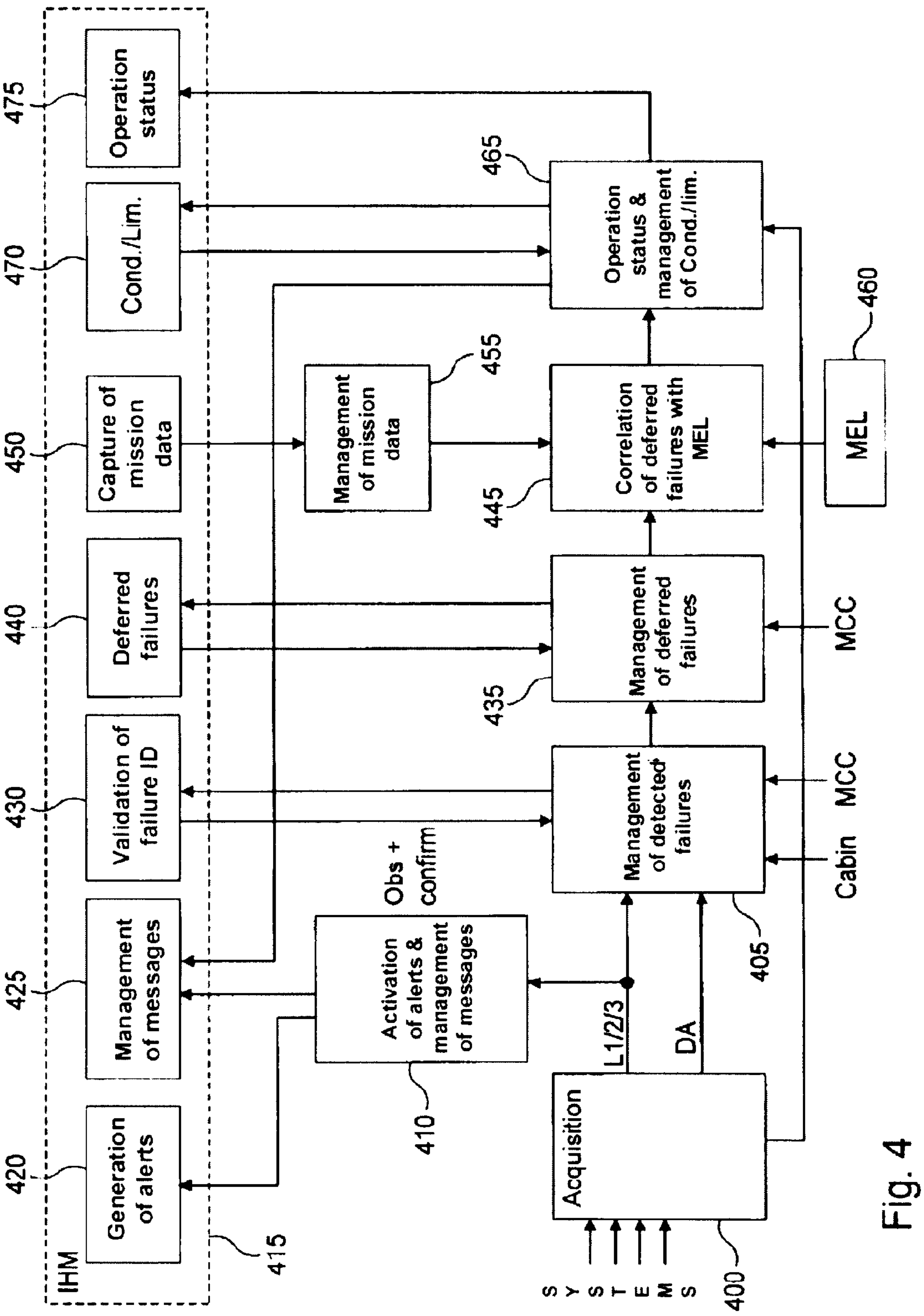
FIG. 4 schematically illustrates an example of implementation, in the form of modules, of the process for aiding in the decision on operation of an aircraft described with reference to FIG. 3.

FIG. 4 schematically illustrates an example of implementation, in the form of modules, of the process for aiding in the decision on operation of an aircraft described with reference to FIG. 3.

An acquisition module 400 makes it possible to receive alerts originating from devices suited to detecting failures. All the alerts received are transmitted to a module for management of detected faults 405. The alerts that are to be made known to the pilot are transmitted to a module for activation of alerts and management of messages 410. Filtering of the alerts is implemented here according to the nature of the alerts. All the alerts of warning, caution and caution level 3, also called L1/2/3, are indicated to the pilot, while the alerts of DA type are not.

The man-machine interface 415, also called IHM, comprises several interface modules (or alternatively a single module comprising several functionalities), in particular an interface for generation of alerts 420 to indicate the alerts as well as an interface for management of messages 425 to display the messages comprising the alerts.

In order to identify the failures detected but on which an ambiguity exists, data originating from the maintenance control center (MCC) and from other sources, in particular from observations by the pilot, are used. A classification of the detected failures advantageously is offered to the pilot who, according to his observations, does or does not validate the identification through a validation interface 430. This interface also makes it possible to display all the detected failures and to modify their status.

If a detected failure is not remedied immediately, it goes into a status referred to as "deferred" according to which the failure is handled later. The module 435 manages all the detected failures having the "deferred" status. The list of these failures can be displayed through interface 440.

The list of detected failures having the "deferred" status is transmitted to a correlation module 445 to which there also are transmitted mission information items managed in a flight data management module 455. The flight data here are input through interface 450. Alternatively, these data can be received from the operating control centre.

These mission data are correlated with the detected failures having the "deferred" status and with the MEL in order to determine the functional and operating conditions and limitations. These conditions and limitations are generated here by the module 465. They can be displayed via interfaces 425 and 470 and modified through interface 470. These conditions and limitations make it possible to determine an operation status that can be indicated to the pilot via interface 475 to allow him to decide whether the aircraft can be operated to carry out the defined missions.

Figure 5:
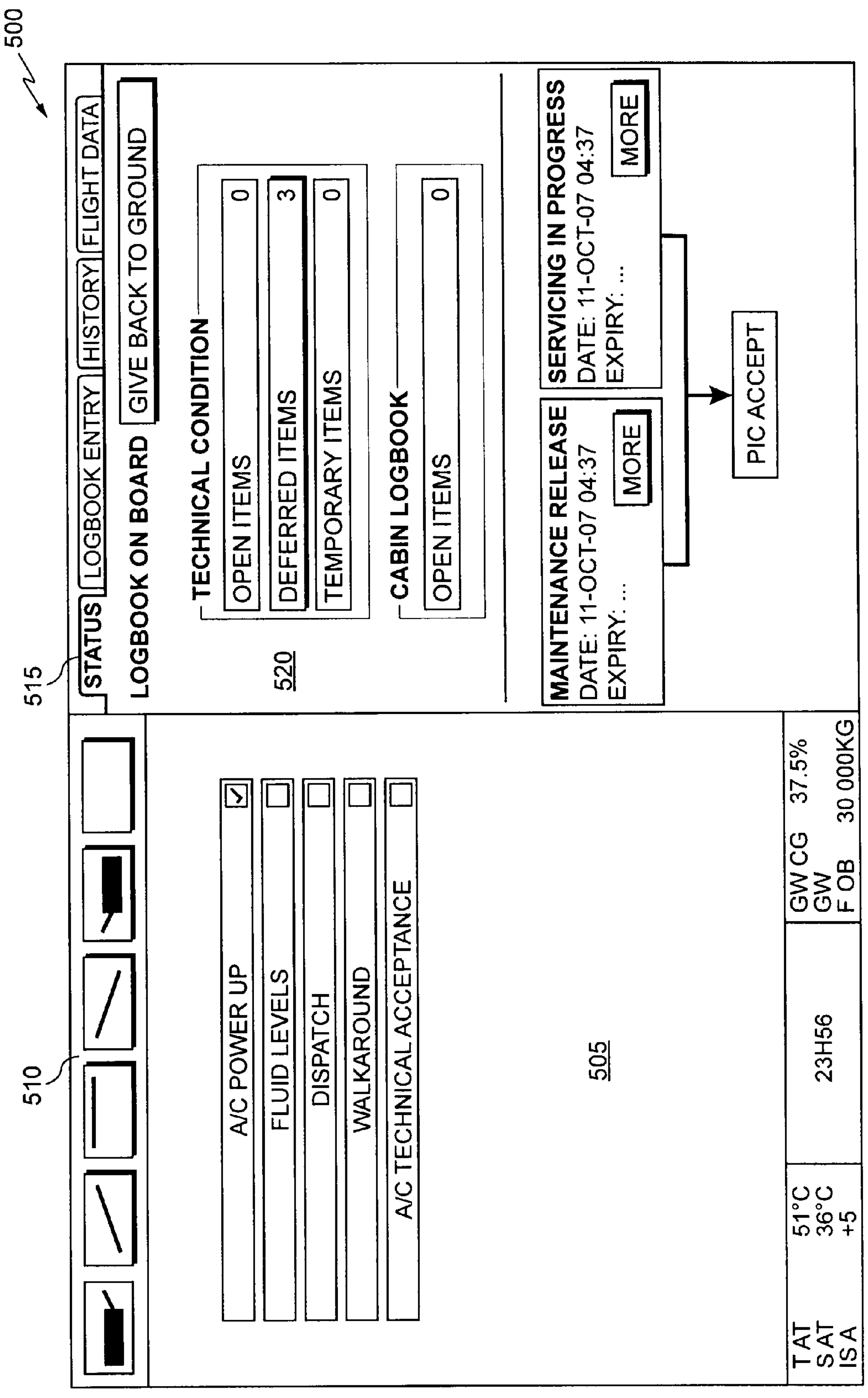
FIGS. 5 and 6 show two pages of an exemplary man-machine interface that can be used to implement the invention; and, FIG. 7 illustrates an exemplary physical architecture adapted for implementing the modules of the process for aiding in the decision on operation of an aircraft illustrated on FIG. 4.

FIG. 5 shows a first page of an exemplary man-machine interface that can be used to implement the invention. The interface 500 here comprises a portion on the left making it possible to select the actions or the verifications to be performed (reference 505) according to each flight phase (reference 510). The left portion of the interface here is used to present and modify information items such as statuses, a logbook, a history and flight data. These information items can be selected according to their category, for example with the aid of tabs as shown. Here, tab 515 linked to status information items is selected. This tab makes it possible in particular to access the list of detected failures, called "open items", and the list of deferred detected failures, called "deferred items," from zone 520.

Figure 6:
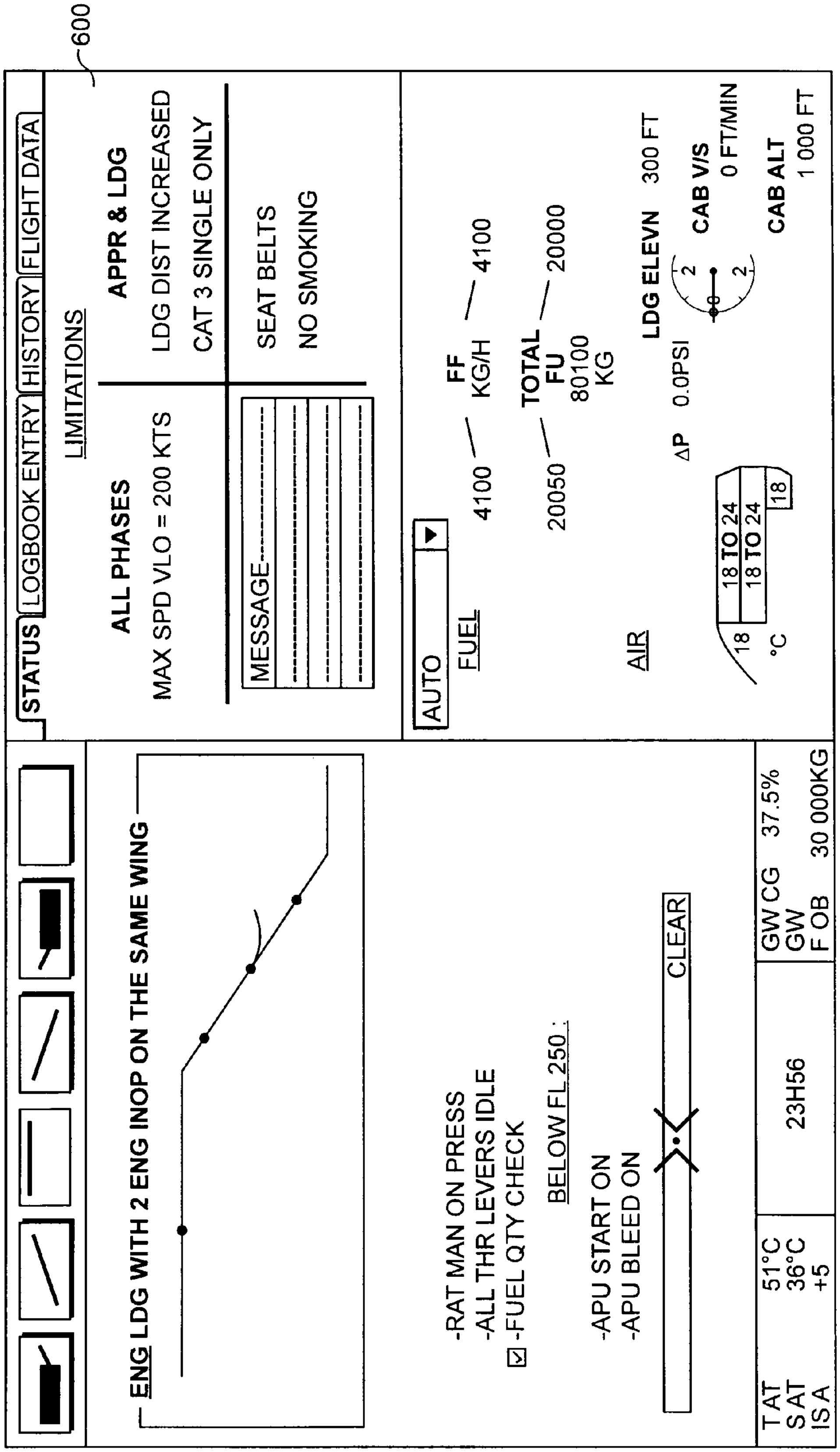

FIG. 6 shows a second page of an exemplary man-machine interface that can be used to implement the invention. This page makes it possible to display the functional and operating limitations and conditions of the aircraft (reference 600). This page can be accessed, from interface 500, by selecting the "dispatch" button on the left portion of the page.

Figure 7:
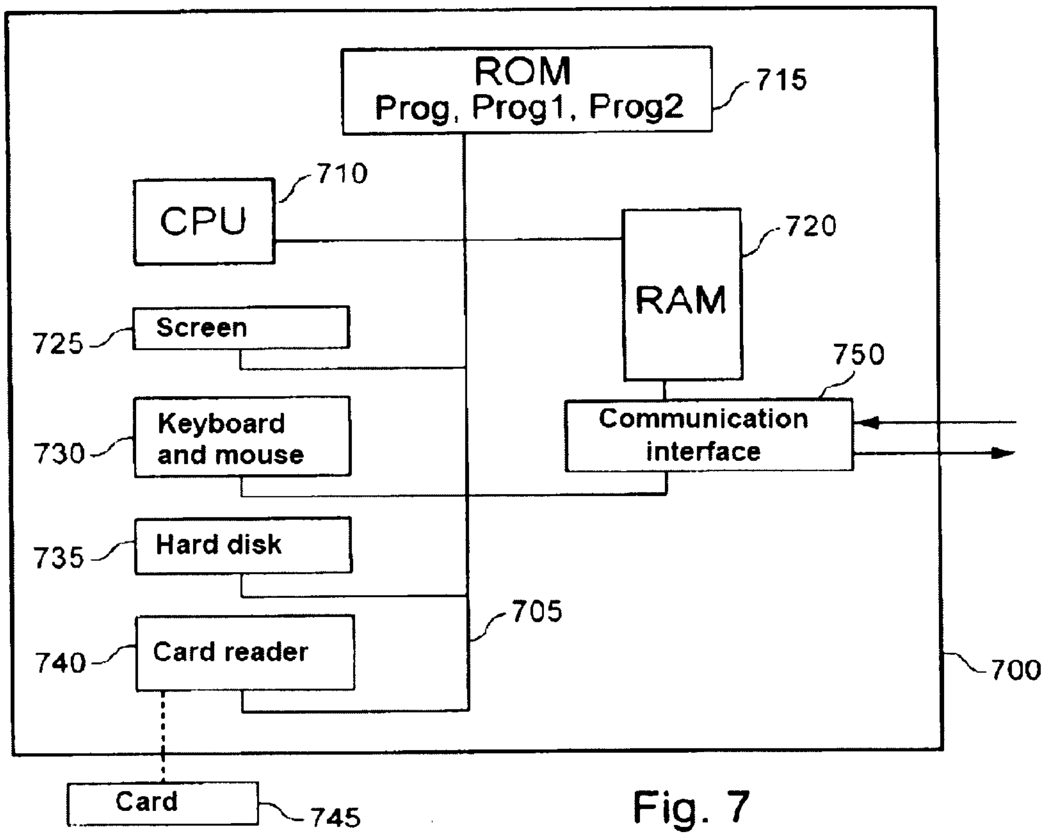

FIG. 7 illustrates an example of the physical architecture adapted for implementing the modules of the process for aiding in the decision on operation of an aircraft illustrated on FIG. 4. The device 700 here comprises a communication bus 705 to which there are connected:

a central processing unit or microprocessor 710 (CPU, abbreviation for Central Processing Unit in English terminology);

a read-only memory 715 (ROM, acronym for Read Only Memory in English terminology) that can comprise the programs necessary for implementation of the invention;

a random access memory or cache memory 720 (RAM, acronym for Random Access Memory in English terminology) comprising registers adapted for recording the variables and parameters created and modified in the course of execution of the aforesaid programs; and a communication interface 750 adapted for transmitting and receiving data, especially to and from the systems for detection of failures.

Preferably, device 700 also has the following elements:

a screen 725 making it possible to display data and to serve as a graphic interface with the user, as illustrated on FIGS. 5 and 6, who will be able to interact with the programs according to the invention, with the aid of a keyboard and a mouse 730 or another pointing device such as a touch screen or a remote control.

a hard disk 735 that can comprise the aforesaid programs and data processed or to be processed according to the invention; and a memory-card reader 740 adapted for receiving a memory card 745 and reading or writing therein data processed or to be processed according to the invention.

The communication bus permits communication and interoperability among the different elements included in device 700 or connected thereto. The depiction of the bus is not limitative and, in particular, the central unit is capable of communicating instructions to any element of device 700 directly or via another element of device 700.

The executable code of each program permitting the programmable device to implement the processes according to the invention can be stored, for example, on hard disk 735 or in read-only memory 715.

According to one variant, memory card 745 can contain data, especially a table of correspondence between the detected events and the commands that can be requested, as well as the executable code of the aforesaid programs which, once read by device 700, is stored on hard disk 735.

According to another variant, it will be possible for the executable code of the programs to be received as least partly via interface 750, to be stored in a manner identical to that described above.

More generally, it will be possible for the program or programs to be loaded into one of the storage means of device 700 before being executed.

Central unit 710 will control and direct the execution of the instructions or portions of software code of the program or programs according to the invention, which instructions are stored on hard disk 735 or in read-only memory 715 or else in the other aforesaid storage elements. During boot-up, the program or programs that is or are stored in a non-volatile memory, for example hard disk 735 or read-only memory 715, are transferred to random-access memory 720 which then contains the executable code of the program or programs according to the invention, as well as the registers for storing the variables and parameters necessary for implementation of the invention.

Naturally, to satisfy specific needs, an individual competent in the field of the invention will be able to apply modifications in the foregoing description.

The invention claimed is:

1. A method for aiding in a diagnosis and in a decision on operation of an aircraft, said aircraft including failure detection circuitry associated with corresponding pieces of equipment of said aircraft, the method comprising:

receiving, using communication circuitry, during a flight of said aircraft currently in progress, at least one alert linked to detection of at least one failure relating to at least one piece of equipment of said aircraft, said at least one alert including at least one indication relating to said at least one failure;

receiving, using the communication circuitry, during the flight of said aircraft currently in progress, at least one information item relating to a next mission of said aircraft;

accessing, using processing circuitry, a database including a minimum equipment list and operating conditions and limitations associated with the operation of said aircraft;

correlating, using the processing circuitry, during the flight of said aircraft currently in progress, said at least one indication relating to said at least one failure with said minimum equipment list;

determining, using the processing circuitry, in response to said correlating said at least one indication relating to said at least one failure with said minimum equipment list, an operating state of said aircraft and an operational capability of said aircraft in said determined operating state;

correlating, using the processing circuitry, during the flight of said aircraft currently in progress, said at least one indication relating to said at least one failure with said at least one information item relating to the next mission of said aircraft;

determining, using the processing circuitry, during the flight of said aircraft currently in progress, in response to said correlating said at least one indication relating to said at least one failure with said at least one information item relating to the next mission of said aircraft, at least one operation limitation or restriction associated with the determined operating state and operational capability of said aircraft; and displaying, using display circuitry, during the flight of said aircraft currently in progress, a notification of the at least one alert to a pilot operating said aircraft upon determination that the next mission is scheduled to occur and that the determined operation limitation or restriction indicates that the next mission cannot be performed without the pilot performing a procedure related to said at least one detected failure.

2. The method according to claim 1, further comprising:

establishing, using the processing circuitry, a list of additional tasks and verifications to be performed in response to said correlating said at least one indication relating to said at least one failure with said at least one information item relating to the next mission of said aircraft.

3. The method according to claim 2, further comprising:

associating, using the processing circuitry, a time indication with at least one component of said minimum equipment list in order to allow the automatic presentation of the said component to the pilot of the said aircraft at the time defined by the said time indication.

4. The method according to claim 1, wherein said correlating said at least one indication relating to said at least one failure with said minimum equipment list includes determining a functional state of said aircraft.

5. The method according to claim 1 further comprising:

identifying, using the processing circuitry, said at least one failure, said identifying including receiving at least one additional indication relating to said at least one failure.

6. A non-transitory computer readable storage medium having executable instructions which when executed by a processor in an aircraft diagnostic device causes the processor to execute a method comprising:

receiving, during a flight of said aircraft currently in progress, at least one alert linked to detection of at least one failure relating to at least one piece of equipment of said aircraft, said at least one alert including at least one indication relating to said at least one failure;

receiving, during the flight of said aircraft currently in progress, at least one information item relating to a next mission of said aircraft;

accessing a database including a minimum equipment list and operating conditions and limitations associated with the operation of said aircraft;

correlating, during the flight of said aircraft currently in progress, said at least one indication relating to said at least one failure with said minimum equipment list;

determining, in response to said correlating said at least one indication relating to said at least one failure with said minimum equipment list, an operating state of said aircraft and an operational capability of said aircraft in said determined operating state;

correlating, during the flight of said aircraft currently in progress, said at least one indication relating to said at least one failure with said at least one information item relating to the next mission of said aircraft;

determining, during the flight of said aircraft currently in progress, in response to said correlating said at least one indication relating to said at least one failure with said at least one information item relating to the next mission of said aircraft, at least one operation limitation or restriction associated with the determined operating state and operational capability of said aircraft; and displaying, during the flight of said aircraft currently in progress, a notification of the at least one alert to a pilot operating said aircraft upon determination that the next mission is scheduled to occur and that the determined operation limitation or restriction indicates that the next mission cannot be performed without the pilot performing a procedure related to said at least one detected failure.

7. An aircraft diagnostic device comprising a hardware processor configured to:

receive, during a flight of said aircraft currently in progress, at least one alert linked to detection of at least one failure relating to at least one piece of equipment of said aircraft, said at least one alert including at least one indication relating to said at least one failure;

receive, during the flight of said aircraft currently in progress, at least one information item relating to a next mission of said aircraft;

access a database including a minimum equipment list and operating conditions and limitations associated with the operation of said aircraft;

correlate, during the flight of said aircraft currently in progress, said at least one indication relating to said at least one failure with said minimum equipment list;

determine, in response to said correlating said at least one indication relating to said at least one failure with said minimum equipment list, an operating state of said aircraft and an operational capability of said aircraft in said determined operating state;

correlate, during the flight of said aircraft currently in progress, said at least one indication relating to said at least one failure with said at least one information item relating to the next mission of said aircraft;

determine, during the flight of said aircraft currently in progress, in response to said correlating said at least one indication relating to said at least one failure with said at least one information item relating to the next mission of said aircraft, at least one operation limitation or restriction associated with the determined operating state and operational capability of said aircraft; and display, during the flight of said aircraft currently in progress, a notification of the at least one alert to a pilot operating said aircraft upon determination that the next mission is scheduled to occur and that the determined operation limitation or restriction indicates that the next mission cannot be performed without the pilot performing a procedure related to said at least one detected failure.

8. An aircraft comprising:

a processor configured to:

receive, during a flight of said aircraft currently in progress, at least one alert linked to detection of at least one failure relating to at least one piece of equipment of said aircraft, said at least one alert including at least one indication relating to said at least one failure, receive, during the flight of said aircraft currently in progress, at least one information item relating to a next mission of said aircraft, access a database including a minimum equipment list and operating conditions and limitations associated with the operation of said aircraft, correlate, during the flight of said aircraft currently in progress, said at least one indication relating to said at least one failure with said minimum equipment list, determine, in response to said correlation of said at least one indication relating to said at least one failure with said minimum equipment list, an operating state of said aircraft and an operational capability of said aircraft in said determined operating state, correlate, during the flight of said aircraft currently in progress, said at least one indication relating to said at least one failure with said at least one information item relating to the next mission of said aircraft, and determine, during the flight of said aircraft currently in progress, in response to said correlation of said at least one indication relating to said at least one failure with said at least one information item relating to the next mission of said aircraft, at least one operation limitation or restriction associated with the determined operating state and operational capability of said aircraft; and a display device configured to display, during the flight of said aircraft currently in progress, a notification of the at least one alert to a pilot operating said aircraft upon determination that the next mission is scheduled to occur and that the determined operation limitation or restriction indicates that the next mission cannot be performed without the pilot performing a procedure related to said at least one detected failure.

9. A method for aiding in a diagnosis and in a decision on operation of an aircraft, said aircraft including failure detection circuitry associated with corresponding pieces of equipment of said aircraft, the method comprising:

after detecting at least one failure and during a flight of said aircraft currently in progress:

receiving, using a processor, at least one alert linked to detection of the at least one failure relating to at least one piece of equipment of said aircraft, said at least one alert including at least one indication relating to said at least one failure;

receiving, using the processor, at least one information item relating to a next mission of said aircraft;

accessing, using the processor, a database including a minimum equipment list and operating conditions and limitations associated with the operation of said aircraft;

correlating, using the processor, said at least one indication relating to said at least one failure with said minimum equipment list;

determining, using the processor, in response to said correlating said at least one indication relating to said at least one failure with said minimum equipment list, an operating state of said aircraft and an operational capability of said aircraft in said determined operating state;

correlating, using the processor, said at least one indication relating to said at least one failure with said at least one information item relating to the next mission of said aircraft; and determining, using the processor, in response to said correlating said at least one indication relating to said at least one failure with said at least one information item relating to the next mission of said aircraft, at least one operation limitation or restriction associated with the determined operating state and operational capability of said aircraft.

* * * * *